Figures 1, 2:
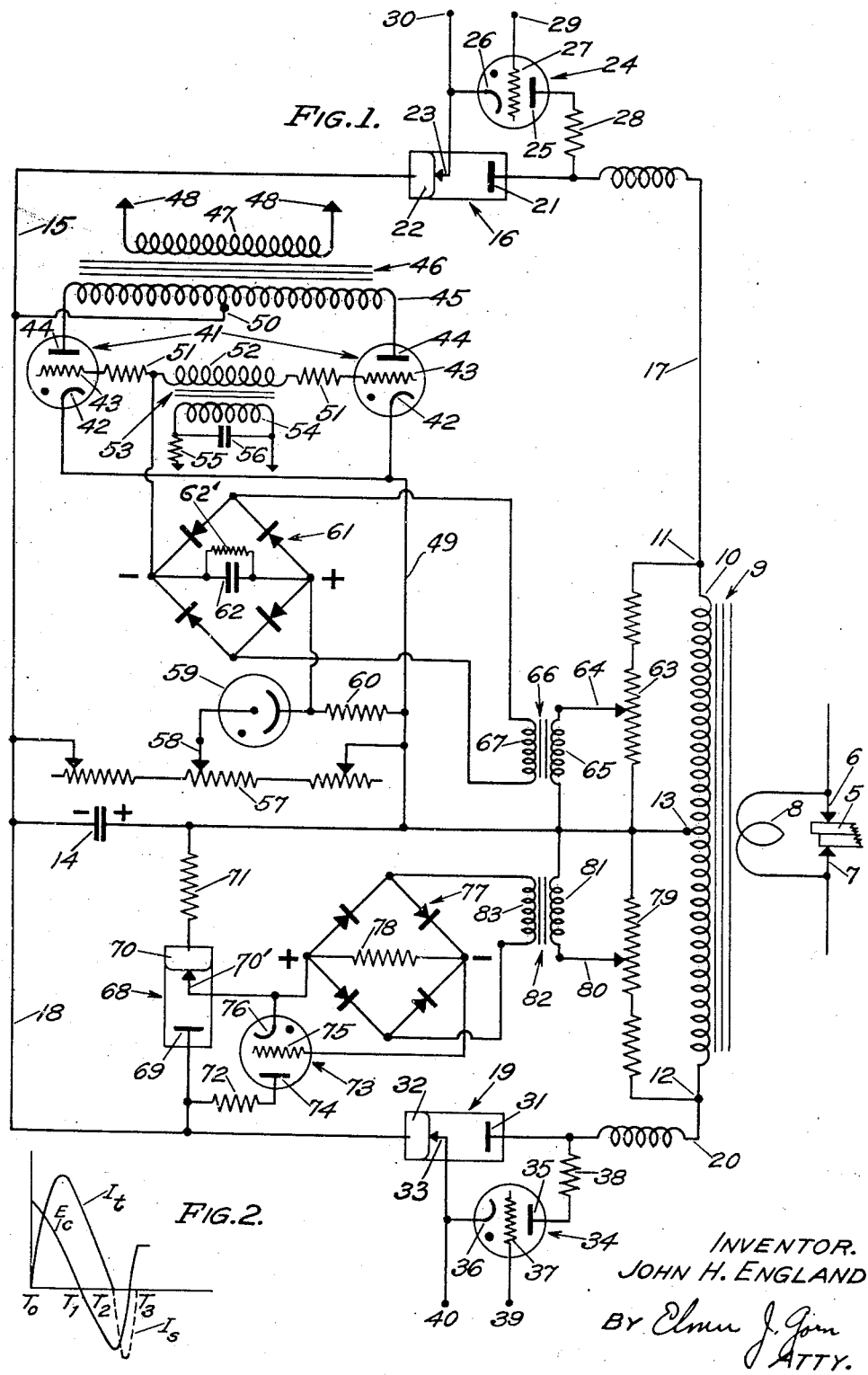

Jan. 18, 1949.  J. H. ENGLAND  2,459,154
WELDING SYSTEM
Filed May 28, 1945

INVENTOR.
JOHN H. ENGLAND
BY Elmer J. Gorn
ATTY.

Patented Jan. 18, 1949

2,459,154

UNITED STATES PATENT OFFICE 2,459,154

WELDING SYSTEM

John H. England, Wellesley Hills, Mass., assignor to Raytheon Manufacturing Company, Newton, Mass., a corporation of Delaware Application May 28, 1945, Serial No. 596,120

13 Claims. (Cl. 219—4)

This invention relates to a welding system and more particularly to a welding system in which electrical energy is stored in a condenser and subsequently discharged into a welding load circuit to supply the welding current to a resistance welding load.

In systems of the type to which the invention relates, the condenser is charged from a suitable source of rectified current. It is desirable that this source of charging current be controlled so that the condenser can be charged to a definite predetermined value in order that the energy supplied to the load will not vary from the predetermined value. Systems have heretofore been proposed for regulating the voltage to which the condenser is charged. However, where such systems are dependent solely upon the charge on the condenser, then current from the source of supply may flow directly to the work along with the stored energy, and thus the quantity of energy supplied to the work varies even though the condenser has been charged to a predetermined voltage. In some instances the recharging of the condenser has been made dependent upon a predetermined time delay from the initiation of the discharge thereof. However, since the duration of the discharge of the condenser may vary over wide limits, the time delay means must be correlated to the particular wave form of the discharge; otherwise the charging current will be supplied to the condenser too soon with resulting variations in the energy supplied to the work, or an unnecessary delay may result between the charging condenser and the discharge thereof resulting in slowing down the operation of the system in effecting a plurality of successive welds.

It is among the objects of the present invention to provide a system of the type described in which the condenser is charged to and maintained at a predetermined potential and in which the recharging current is held off until after the welding current through the transformer has ceased so that regardless of the duration of the current flow through this transformer the supply of charging current to the condenser is blocked as long as current flows in the discharge circuit.

It is a further object of the invention to provide a system in which the same element utilized to control the charging current in response to the voltage on the condenser is also utilized to control the charging current in response to the current flow through the welding transformer of the system.

In systems of the type to which the invention relates, a considerable amount of energy is stored in the system, including the welding transformer at the instant that the condenser is fully discharged. This energy tends to maintain the current flow in the same direction as the original discharge of the condenser and thus tends to charge the condenser in an inverse polarity. This energy may be trapped upon the condenser in the inverse polarity due to the unidirectional nature of the conduction of the tubes controlling the discharge of the condenser through the welding transformer. This energy is lost if the recharging current is supplied to the condenser while the inverse charge exists thereon. If this inverse charge is permitted to reverse itself through the welding transformer, then the welding period is greatly prolonged, while an impulse of low energy content slowly decays therethrough.

It is a further object of the present invention to permit the inverse charge on the condenser to reverse itself through a shunt path by-passing the welding transformer and to effect the reversal of this inverse charge at the instant that the current to the welding transformer drops to zero and while the supply of charging current to the condenser is still blocked.

In systems of the type to which the invention relates, a considerable amount of residual flux may remain in the metallic core of the welding transformer after the welding operation. This residual flux may vary from weld to weld building up over a number of successive welds. Such variations in the residual flux result in variations of the energy supplied to the work even though the energy stored on the condenser is constant.

It is an object of the present invention to reverse the residual flux of the transformer upon each successive weld. To this end the invention contemplates a system in which the current flows in one direction through the welding transformer to effect one welding operation and flows in the opposite direction through the welding transformer to effect the next succeeding welding operation. A further object of the invention is to provide a system in which the control of charging current to the condenser is effected in response to current flow through the welding transformer regardless of the direction of the current through the transformer.

The above and other objects and features of the invention will be made fully apparent to those skilled in the art from a consideraiton of the following detailed description taken in conjunction with the accompanying drawing in which:

Fig. 1 is a circuit diagram of a welding system assembled in accordance with the present invention; and Fig. 2 shows a set of curves representing certain operating characteristics of said system.

Referring to the drawing, reference numeral 5 indicates the work to which welding current is supplied by way of electrodes 6 and 7 from the secondary loop 8 of a welding transformer 9 having a primary winding 10. The primary winding 10 is provided with end taps 11 and 12 and a center tap 13. The center tap 13 divides the primary winding 10 of the transformer 9 into an upper half and a lower half. The welding energy is supplied alternately to the two halves of the primary winding, one complete weld being effected through one half of the primary winding 10 and the next succeeding weld being effected through the other half. The welding energy is supplied from a storage condenser 14, or from a bank of such condensers. The positive side of condenser 14 is connected directly to the center tap 13, and its negative terminal is connected to both of the end taps 11 and 12. The connection through the end tap 11 is by way of a conductor 15, a controlled gaseous discharge device 16, and a conductor 17. The connection to the end tap 12 is by way of a conductor 18, the gaseous discharge device 19, and conductor 20. The controlled discharge tubes 16 and 19 are preferably of the ignitron type having, respectively, anodes 21 and 31 connected to the end taps 11 and 12, respectively, and mercury pool type cathodes 22 and 32 jointly connected to the negative terminal of the condenser 14. In order to initiate the discharge of the tubes 16 and 19 they are provided with resistance-immersion ignitors 23 and 33, respectively. In order to supply energizing impulses to the resistance-immersion ignitors 23 and 33, the same are connected by way of gaseous discharge devices 24 and 34 to the respective anodes 21 and 31. The discharge device 24 includes an anode 25 connected to the anode 21, a permanently energized cathode 26 connected to the resistance-immersion type ignitor 23, and a control grid 27. A current limiting resistor 28 may be provided in the anode circuit 25 to prevent the overloading of device 24. The gaseous discharge device 34 likewise includes an anode 35 connected to the anode 31 of the tube 19, a permanently energized cathode 36 connected to the resistance-immersion ignitor 33, and a control grid 37. A current limiting resistor 38 prevents the overloading of the tube 34. Tubes 24 and 34 are normally non-conductive due to a blocking potential applied across the terminals 29 and 30 and 39 and 40, respectively. On removing the blocking potential, which may be effected in a known manner in response to some operation of the welding machine, such as the closure of the electrodes 6 and 7 on the work pieces 5 or the application of welding pressure thereto, either tube 24 or tube 34 will fire to supply an igniting impulse to the corresponding ignitor 23 or 33.

In order to charge the condenser 14 to a predetermined potential a direct current is supplied thereto from a rectifier including a pair of rectifier tubes 41. These tubes may be of the gas or vapor filled type having permanently energized cathodes 42. These cathodes may be thermionic filaments or any other suitable type of cathode. The rectifier tubes 41 are provided with control grids 43 and anodes 44. The anodes 44 are connected to the opposite sides of the secondary winding 45 of a power transformer 46 having a primary winding 47. This primary winding 47 is connected at terminals 48 to a suitable source of alternating current.

The two cathodes 42 are jointly connected by a conductor 49 to the positive side of the condenser 14. A center tap 50 on the primary winding 45 of the transformer 46 is connected to the negative side of the condenser 14 through the conductor 15.

In order to control the potential to which the condenser 14 is charged and prevent recharging of the condenser while current from a preceding discharge is still flowing in the system, the grids 43 are each connected through a resistor 51 to the outer end of the secondary winding 52 of a grid transformer 53 having a primary winding 54. The primary winding 54 is supplied with alternating current of the same frequency as that supplied to the primary winding 47 of the power transformer 46. This A. C. voltage is phase shifted by means of a series resistor 55 and a condenser 56 connected across primary 54 of the grid transformer.

In order to supply a blocking potential to grid 43 when the condenser 14 reaches a predetermined potential, a potentiometer including a resistor 57 is connected across the condenser 14. The adjustable arm or tap 58 of the potentiometer is connected to the negative electrode of a voltage regulating diode 59, the positive electrode of which is connected through a resistor 60 of high resistance to the positive terminal of the condenser 14. A bridge type rectifier 61 has its positive terminal connected to the lead between the resistor 60 and the voltage regulating tube 59. The negative side of the bridge rectifier 61 is connected to the grid circuit at a point between the grid resistors 51. Preferably, a condenser 62 of about .1 microfarad is connected across the positive and negative terminals of the rectifier.

In order to provide a biasing potential upon the grids 43, whenever current is flowing through the system I provide a potentiometer 63 across one of the halves of the primary winding 10, in the instance shown, the upper half. The potentiometer 63 is provided with an adjustable arm or tap 64 connected to one end of the primary winding 65 of a transformer 66 having a secondary winding 67. The opposite end of the primary winding 65 is connected to the center tap 13 of the primary winding 10. The outer ends of the primary winding 67 of the transformer 66 are connected to the neutral terminals of the rectifier 61.

In the operation of the voltage regulator and hold-off system, it will be seen that when there is no charge upon the condenser 14 and when there is no current flow through the primary winding 10 of the transformer 9, then no current is flowing through either potentiometer 57 or the potentiometer 63. No voltage exists across the tube 59, and the potential upon the control grid 43 comprises only the alternating phase shifting voltage applied by the grid transformer 53. Since the grids are either at the same potential as the cathodes or positive, the rectifier tubes 41 will fire as soon as the power transformer 46 is energized.

As the condenser 14 becomes charged, current flows through the potentiometer 57 causing the tap 58 to become more negative with respect to the positive terminal of the condenser 14. Since the tap 58 is connected to the cathode of the voltage regulator tube 59, and the anode of said tube is connected to the positive terminal of the condenser 14, the tube 59 conducts as soon as the potential thereacross reaches its breakdown potential, which is approximately 115 volts. This conduction occurs when a predetermined voltage on the condenser 14 is reached, as determined by the setting of the potentiometer 57.

The conduction of the tube 59 causes current to flow through the resistor 60. This makes the left-hand side of the resistor 60 negative. This negative voltage applied to the rectifier 61 appears on the grids 43 of the rectifier tubes 41 which blocks them as soon as their anode voltage in the course of the alternating voltage applied thereto by transformer 46 falls below their arc drop.

Since there is some loss of energy from the condenser 14, particularly after the same has been charged to the desired predetermined potential, due to the losses through the potentiometer 57 and the tube 59, it is desirable to make up these losses continuously so that at the instant the discharge of the condenser 14 through the welding circuit is initiated the condenser will be at the desired predetermined potential.

To this end I provide for the supply of a continuous trickle of current from either one or both of the tubes 41 of the rectifier during the period when the condenser 14 is charged and awaiting discharge through the welding circuit. This function is effected by means of the grid transformer 53 which applies an A. C. voltage of approximately 37 volts superimposed on the continuous negative voltage applied from the potentiometer 57. This A. C. voltage is phase shifted by means of the series resistor 55 and condenser 56 so that one or the other of the tubes 41 is unblocked during only a small portion of the half wave of positive potential applied from the transformer 46.

Since the tube 59 always conducts at a definite breakdown voltage, for example 115 volts, it is used as a source of target or reference voltage.

The condenser 14 being charged to predetermined value, the condenser is discharged through the welding circuit by way of one or the other of the tubes 16 and 19. Assuming that it is the turn of the tube 16 to fire to discharge the condenser 14 through the upper winding 10 of the transformer 9, the blocking potential normally supplied across the terminals 29 and 30 is discontinued in response to the operation of the welding machine while the blocking potential continues to be supplied to the grid 37 of the tube 34 through the terminals 39 and 40. Since at this instant a high potential is applied by the condenser 14 across the tube 24, this tube fires to conduct an igniting impulse to the ignitor 23 of the tube 16. As shown in Fig. 2, at the time $T_1$ that the condenser charge $E_c$ reaches zero, the current $I_t$ through the transformer has passed its maximum. At this time there is no potential applied from the potentiometer 57 across the tube 59 and accordingly the negative blocking potential is not applied to the grids 43 from this source. Unless other means were provided to block the supply of direct current from the rectifier at this time, direct current from the rectifier would be supplied to the welding circuit from the source of supply. Since the series tube 16 is conductive at this time it might continue to conduct current from the direct current source indefinitely. In order to prevent the supply of direct current to the system at a time when a charge $E_c$ on the condenser is low and while current is still flowing in the system, I provide a potentiometer 63 across one of the halves of the primary winding 10 of the transformer 9, in this instance the upper half. The adjustable tap 64 of the potentiometer 63 is connected to one end of the primary winding 65 of the transformer 66. The other end of the primary winding 65 is connected to the positive side of the condenser 14. The secondary winding 67 of the transformer 66 is connected to the neutral terminals of the rectifier 61. Since the negative side of the rectifier 61 is connected to the grid 43 and the positive side of the rectifier is connected through the resistor 60 to the cathodes 42, a negative bias potential is supplied to the grid 43 as long as current flows in the primary winding 10, that is to say, until the time $T_2$. It will be noted that it is immaterial whether the potentiometer 63 is connected across the upper half of the primary winding 10 or the lower half thereof. When the current is through the upper half of the primary winding, a voltage is applied directly across the potentiometer 63. When the current is through the lower half of the transformer, a voltage is induced across the upper half. The potentiometer 63 therefore functions to supply a hold-off voltage to the grid 43 as long as current is flowing through the system regardless of whether the welding impulse is directed through the upper half of the transformer or through the lower half. In order to smooth out the pulse of direct current supplied to the grids 43 through the rectifier 61 from the transformer 66, and for other reasons which will hereinafter appear, a condenser 62 of approximately 0.1 mfd. is connected across the positive and negative terminals of the rectifier 61.

At the time $T_1$ when the charge across the condenser has fallen to zero and the current $I_t$ is at or near a maximum, a considerable amount of energy is stored in the welding circuit including the transformer 9. This energy tends to maintain the current in the system in the same direction as previously and thus tends to recharge the condenser 14 in an inverse polarity. At a time $T_2$ when the current $I_t$ has dropped to zero, the inverse charge on the condenser 14 is at a maximum. Since the series tubes 16 and 19 prevent conduction through the welding circuit in an inverse direction, this inverse charge would normally be trapped on the condenser 14, and the energy represented by the inverse charge would be wasted. In order to conserve this energy I proceed as follows:

An ignitron 68 is provided in a shunt circuit across the condenser 14 having its anode 69 connected to the normally negative side of the condenser 14 and its cathode 70 connected through a reactor 71 to the normally positive side of the condenser. The cathode 70 is of the mercury pool type and a resistance-immersion ignitor 70' is provided for initiating a discharge through the tube 68. In order to supply energizing impulses to the ignitor 70' the same is connected by way of a resistor 72 and gaseous discharge device 73 to the anode side of the tube 68. The discharge device 73 includes an anode 74 connected to the anode 69, a control grid 75, and a permanently energized cathode 76 connected to resistance-immersion ignitor 70'. It will be seen from Fig. 2 that at the time $T_2$ when the current $I_t$ has fallen to zero and the inverse charge on the condenser 14 is at a maximum, the inverse charge will be applied to the tubes 68 and 73 in a direction in which these tubes are conductive. In order to prevent conduction through the tube 73 until the instant T₂ when the inverse charge on the condenser 14 has attained its maximum value, a negative bias is supplied to the grid 75 from a rectifier 77 having its positive terminal connected to the cathode 76. Since it is desirable that a small amount of current flow through the rectifier 77 as long as a potential exists across the positive-negative terminals thereof, these terminals are connected through a high resistor 78. A potentiometer 79 having an adjustable arm or tap 80 is connected across one of the halves of the primary winding 10, in this instance the lower half. The primary winding 81 of a transformer 82 has one end connected to the tap 80 and its opposite end connected to the normally positive side of the condenser 14. The secondary winding 83 of the transformer 82 has its opposite end connected to the neutral terminals of the bridge rectifier 77.

As long as the current $I_t$ flows through the welding transformer, a blocking potential is applied to the grid 75 of the tube 73. At the instant T₂, when the current $I_t$ drops to zero, the biasing potential applied to the grid 75 also drops below the cutoff value, and the tube 73 becomes conductive to supply an igniting impulse to the resistance-immersion ignitor 70', whereupon the ignitron 68 becomes conductive. Since this instant T₂ coincides with the maximum inverse charge upon the condenser 14, the inverse charge is reversed, the current through the shunt circuit being indicated by the curve $I_s$. The inverse charge on the condenser is reversed during the relative short period of the time between T₂ and T₃. Although after the time T₂ no biasing potential is applied from the transformer 66 by way of the rectifier 61 to the grids 43 of the rectifier tubes 41, a bias potential is, nevertheless, maintained upon these grids for a period of time at least equal to the duration of the period T₂ to T₃ by means of the condenser 62. By the time T₃ or shortly thereafter the charge on the condenser 62 has dissipated, and the tubes 41 again become conductive to increase the charge on the condenser 14 to the desired value, which value is predetermined by the setting of the potentiometer 57, and the system is then ready to repeat the operation described in the foregoing in order to effect the next succeeding weld.

It will be evident that where the time required to dissipate the charge on the condenser 62 by way of leakages inherent in the system is materially greater than the duration of the period T₂ to T₃, the charge may be permitted to leak off more rapidly through a suitable resistor 62'. The value of this resistor will be sufficiently high, 100,000 ohms or more, to prevent the charge on the condenser 62 from falling below the voltage required to block the tubes 41 until or shortly after the time T₃.

It was assumed in the foregoing that the welding operation described was effected through the upper half of the primary winding 10 by way of the ignitron 16. The next succeeding welding operation may be effected by way of ignitron 19 through the lower half of the primary winding 10 of the transformer 9. The operation will be the same as before, excepting upon this occasion the biasing potential on the grid 27 of the tube 24 will be maintained, and accordingly no igniting impulse will be supplied to the ignitron 16, and this tube will remain non-conductive. The biasing potential supplied to the grid 37 of the tube 34 will be discontinued in response to the operation of the welding machine, and, accordingly, the tube 19 will become conductive due to the igniting impulse supplied to the immersion ignitor 33. The tube 19 will, therefore, permit the discharge of the condenser 14 through the lower half of the primary winding 10 of the transformer 9.

It will be apparent that it is immaterial to the operation of the device whether the potentiometer 79 is connected across the lower half of the primary winding 10 or across the upper half, for when the discharge of the condenser 14 is through the lower half of the primary winding 10 current will flow directly through the potentiometer 79. When the discharge of the condenser 14 is through the upper half of the primary winding 10 a current will be induced in the lower half of the primary winding, again causing the current to flow through the potentiometer 79. Thus both the potentiometer 63 and the potentiometer 79 may be connected across the same part of the primary winding 10, or a single potentiometer having two taps, one for supplying the current to the primary winding 65 of the transformer 66 and the other for supplying current to the primary winding 81 of the transformer 82, may be provided, and this potentiometer may be located across either half of the primary winding 10.

While there has been herein described a preferred embodiment of the invention other embodiments within the scope of the appended claims will be apparent to those skilled in the art, from a consideration of the embodiment shown and the teachings hereof.

What is claimed is:

1. A welding system comprising a storage condenser, means including a rectifier tube for charging said storage condenser, a control electrode in said rectifier tube, a welding load circuit, means for discharging said condenser through said welding load circuit in a unidirectional pulse of current during which said storage condenser is charged in an inverse direction, means responsive to the flow of current through said welding load circuit for supplying a blocking potential to said control electrode of said rectifier tube, a shunt circuit across said condenser, means responsive to the termination of said pulse of current for closing said shunt circuit to reverse the polarity of the inverse charge on said condenser thereby partially recharging the same in the original polarity, and a control condenser adapted to be charged in response to said pulse of current to maintain said blocking potential on said control electrode for a predetermined time after the termination of said pulse of current.

2. A welding system comprising a storage condenser, means including a rectifier tube for charging said storage condenser, a control electrode in said rectifier tube, a welding load circuit, means effective at a predetermined voltage across said condenser for supplying a blocking potential to said control electrode, means for superimposing a phase shifted alternating voltage on said blocking potential, means for discharging said condenser through said welding load circuit in a unidirectional pulse of current during which said storage condenser is charged in an inverse direction, means responsive to the flow of current through said welding load circuit for supplying a blocking potential to said control electrode of said rectifier tube, a shunt circuit across said condenser, means responsive to the termination of said pulse of current for closing said shunt circuit to reverse the polarity of the inverse charge on said condenser thereby partially recharging the same in the original polarity, and a control condenser adapted to be charged in response to said pulse of current to maintain said blocking potential on said control electrode for a predetermined time after the termination of said pulse of current.

3. A welding system comprising a storage condenser, a source of supply for charging said storage condenser, a welding load circuit, control means effective at a predetermined voltage across said storage condenser for controlling the current supplied to said condenser from said source, means for discharging said storage condenser through said welding load circuit in a unidirectional pulse of current, means responsive to the flow of current through said welding load circuit for blocking the current supplied to said condenser from said source, and a control condenser adapted to be charged in response to said pulse of current to continue the blocking of the current from said source to said condenser for a predetermined time after the termination of said pulse of current.

4. A welding system comprising a storage condenser, means including a rectifier tube for charging said storage condenser, a control electrode in said rectifier tube, a welding load circuit, means effective at a predetermined voltage across said storage condenser for supplying a blocking potential to said control electrode, means for superimposing a phase shifted alternating voltage on said blocking potential, means for discharging said condenser through said welding load circuit in a unidirectional pulse of current, means responsive to the flow of current through said welding load circuit for supplying a blocking potential to said control electrode of said rectifier tube, and a control condenser adapted to be charged in response to said pulse of current to maintain said blocking potential on said control electrode for a predetermined time after the termination of said pulse of current.

5. A welding system comprising a storage condenser, means including a rectifier tube for charging said storage condenser, a control electrode in said rectifier tube, a welding load circuit, a bridge rectifier, means effective at a predetermined voltage across said storage condenser for supplying a blocking potential to said control electrode through said bridge rectifier, means for discharging said storage condenser through said welding load circuit in a unidirectional pulse of current during which said storage condenser is charged in an inverse direction, and means responsive to the flow of current through said welding load circuit for supplying a blocking potential through said bridge rectifier to said control electrode of said rectifier tube.

6. A welding system comprising a storage condenser, means including a rectifier tube for charging said storage condenser, a control electrode in said rectifier tube, a welding load circuit, a bridge rectifier, means effective at a predetermined voltage across said storage condenser for supplying a blocking potential to said control electrode through said bridge rectifier, means for superimposing a phase shifted alternating voltage on said blocking potential, means for discharging said storage condenser through said welding load circuit in a unidirectional pulse of current during which said storage condenser is charged in an inverse direction, and means responsive to the flow of current through said welding load circuit for supplying a blocking potential through said bridge rectifier to said control electrode of said rectifier tube.

7. A welding system comprising a storage condenser, means including a rectifier tube for charging said storage condenser, a control electrode in said rectifier tube, a welding load circuit, a bridge rectifier, means effective at a predetermined voltage across said storage condenser for supplying a blocking potential to said control electrode through said bridge rectifier, means for discharging said storage condenser through said welding load circuit in a unidirectional pulse of current during which said storage condenser is charged in an inverse direction, means responsive to the flow of current through said welding load circuit for supplying a blocking potential through said bridge rectifier to said control electrode of said rectifier tube, and a control condenser connected across the positive and negative terminals of said bridge rectifier adapted to be charged in response to said pulse of current to maintain said blocking potential on said control electrode for a predetermined time after the termination of said pulse of current.

8. A welding system comprising a storage condenser, means including a rectifier tube for charging said storage condenser, a control electrode in said rectifier tube, a welding load circuit, a bridge rectifier, means effective at a predetermined voltage across said storage condenser for supplying a blocking potential to said control electrode through said bridge rectifier, means for superimposing a phase shifted alternating voltage on said blocking potential, means for discharging said storage condenser through said welding load circuit in a unidirectional pulse of current during which said storage condenser is charged in an inverse direction, means responsive to the flow of current through said welding load circuit for supplying a blocking potential through said bridge rectifier to said control electrode of said rectifier tube, and a control condenser connected across the positive and negative terminals of said bridge rectifier adapted to be charged in response to said pulse of current to maintain said blocking potential on said control electrode for a predetermined time after the termination of said pulse of current.

9. A welding system comprising a storage condenser, means including a rectifier tube for charging said storage condenser, a control electrode in said rectifier tube, a welding load circuit, a bridge rectifier, means effective at a predetermined voltage across said storage condenser for supplying a blocking potential to said control electrode through said bridge rectifier, means for discharging said storage condenser through said welding load circuit in a unidirectional pulse of current during which said storage condenser is charged in an inverse direction, means responsive to the flow of current through said welding load circuit for supplying a blocking potential through said bridge rectifier to said control electrode of said rectifier tube, a shunt circuit across said storage condenser, and means responsive to the termination of said pulse of current for closing said shunt circuit to reverse the polarity of the inverse charge on said condenser thereby partially recharging the same in the original polarity.

10. A welding system comprising a storage condenser, means including a rectifier tube for charging said storage condenser, a control electrode in said rectifier tube, a welding load circuit, a bridge rectifier, means effective at a predetermined voltage across said storage condenser for supplying a blocking potential to said control electrode through said bridge rectifier, means for superimposing a phase shifted alternating voltage on said blocking potential, means for discharging said storage condenser through said welding load circuit in a unidirectional pulse of current during which said storage condenser is charged in an inverse direction, means responsive to the flow of current through said welding load cricuit for supplying a blocking potential through said bridge rectifier to said control electrode of said rectifier tube, a shunt circuit across said storage condenser, and means responsive to the termination of said pulse of current for closing said shunt circuit to reverse the polarity of the inverse charge on said condenser thereby partially recharging the same in the original polarity.

11. A welding system comprising a storage condenser, means including a rectifier tube for charging said storage condenser, a control electrode in said rectifier tube, a welding load circuit, a bridge rectifier, means effective at a predetermined voltage across said storage condenser for supplying a blocking potential to said control electrode through said bridge rectifier, means for discharging said storage condenser through said welding load circuit in a unidirectional pulse of current during which said storage condenser is charged in an inverse direction, means responsive to the flow of current through said welding load circuit for supplying a blocking potential through said bridge rectifier to said control electrode of said rectifier tube, a shunt circuit across said storage condenser, means responsive to the termination of said pulse of current for closing said shunt circuit to reverse the polarity of the inverse charge on said condenser thereby partially recharging the same in the original polarity, and a control condenser adapted to be charged in response to said pulse of current to maintain said blocking potential on said control electrode for a predetermined time after the termination of said pulse of current.

12. A welding system comprising a storage condenser, means including a rectifier tube for charging said storage condenser, a control electrode in said rectifier tube, a welding load circuit, a bridge rectifier, means effective at a predetermined voltage across said storage condenser for supplying a blocking potential to said control electrode through said bridge rectifier, means for superimposing a phase shifted alternating voltage on said blocking potential, means for discharging said storage condenser through said welding load circuit in a unidirectional pulse of current during which said storage condenser is charged in an inverse direction, means responsive to the flow of current through said welding load circuit for supplying a blocking potential through said bridge rectifier to said control electrode of said rectifier tube, a shunt circuit across said storage condenser, means responsive to the termination of said pulse of current for closing said shunt circuit to reverse the polarity of the inverse charge on said condenser thereby partially recharging the same in the original polarity, and a control condenser adapted to be charged in response to said pulse of current to maintain said blocking potential on said control electrode for a predetermined time after the termination of said pulse of current.

13. A welding system comprising a storage condenser, means including a rectifier tube for charging said storage condenser, a control electrode in said rectifier tube, a welding load circuit, a bridge rectifier, means effective at a predetermined voltage across said storage condenser for supplying a blocking potential to said control electrode through said bridge rectifier, means for superimposing a phase shifted alternating voltage on said blocking potential, means for discharging said storage condenser through said welding load circuit in a unidirectional pulse of current during which said storage condenser is charged in an inverse direction, means responsive to the flow of current through said welding load circuit for supplying a blocking potential through said bridge rectifier to said control electrode of said rectifier tube, a shunt circuit across said storage condenser, means responsive to the termination of said pulse of current for closing said shunt circuit to reverse the polarity of the inverse charge on said condenser thereby partially recharging the same in the original polarity, and a control condenser connected across the positive and negative terminals of said bridge rectifier adapted to be charged in response to said pulse of current to maintain said blocking potential on said control electrode for a predetermined time after the termination of said pulse of current.

JOHN H. ENGLAND.

REFERENCES CITED

The following references are of record in the file of this patent:

UNITED STATES PATENTS

| Number | Name | Date |
|---|---|---|
| 2,250,102 | Klemperer | July 22, 1941 |
| 2,295,293 | Rogers | Sept. 8, 1942 |